US008390505B2

(12) United States Patent
Fouet et al.

(10) Patent No.: US 8,390,505 B2
(45) Date of Patent: Mar. 5, 2013

(54) PROCESS AND A DEVICE FOR DETECTING AIRCRAFTS CIRCULATING IN AN AIR SPACE SURROUNDING AN AIRPLANE

(75) Inventors: Guillaume Fouet, Leguevin (FR); Xavier Grossin, Tournefeuille (FR); Sébastien Robert, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 301 days.

(21) Appl. No.: 12/825,575

(22) Filed: Jun. 29, 2010

(65) Prior Publication Data

US 2011/0001654 A1 Jan. 6, 2011

(30) Foreign Application Priority Data

Jul. 3, 2009 (FR) ..................................... 09 03262

(51) Int. Cl.
*G01S 13/00* (2006.01)
*G01S 13/74* (2006.01)

(52) U.S. Cl. .................. 342/30; 342/29; 342/42; 342/43

(58) Field of Classification Search .............. 342/29–32, 342/42–51
See application file for complete search history.

(56) References Cited

U.S. PATENT DOCUMENTS

| | | | |
|---|---|---|---|
| 3,714,651 A * | 1/1973 | Lyon | 342/29 |
| 6,047,233 A * | 4/2000 | Salvatore et al. | 701/120 |
| 6,208,284 B1 * | 3/2001 | Woodell et al. | 342/30 |
| 6,542,809 B2 * | 4/2003 | Hehls, III | 701/120 |
| 6,542,810 B2 * | 4/2003 | Lai | 701/120 |
| 6,567,037 B1 * | 5/2003 | Fung et al. | 342/29 |
| 6,573,858 B1 * | 6/2003 | Fung et al. | 342/36 |
| 6,633,259 B1 * | 10/2003 | Smith et al. | 342/456 |
| 7,248,219 B2 * | 7/2007 | Smith et al. | 342/456 |
| 7,420,501 B2 * | 9/2008 | Perl | 342/30 |
| 7,492,307 B2 * | 2/2009 | Coulmeau | 342/32 |
| 7,495,612 B2 * | 2/2009 | Smith | 342/450 |
| 7,525,474 B2 * | 4/2009 | Carocari et al. | 342/47 |
| 7,612,716 B2 * | 11/2009 | Smith et al. | 342/454 |
| 7,855,675 B2 * | 12/2010 | Fouet | 342/33 |
| 7,864,096 B2 * | 1/2011 | Stayton et al. | 342/29 |
| 7,889,114 B2 * | 2/2011 | Meyers et al. | 342/30 |
| 7,961,135 B2 * | 6/2011 | Smith et al. | 342/29 |
| 2002/0021247 A1 * | 2/2002 | Smith et al. | 342/450 |
| 2003/0097216 A1 * | 5/2003 | Etnyre | 701/120 |
| 2005/0007272 A1 * | 1/2005 | Smith et al. | 342/189 |
| 2006/0119515 A1 * | 6/2006 | E. Smith | 342/450 |
| 2007/0109190 A1 * | 5/2007 | Smith | 342/359 |
| 2007/0222664 A1 * | 9/2007 | Perl | 342/29 |
| 2007/0222666 A1 * | 9/2007 | Coulmeau | 342/32 |
| 2009/0184862 A1 * | 7/2009 | Stayton et al. | 342/30 |

(Continued)

FOREIGN PATENT DOCUMENTS

WO WO 00/03263 1/2000

*Primary Examiner* — Jack W Keith
*Assistant Examiner* — Peter Bythrow
(74) *Attorney, Agent, or Firm* — Novak Druce Connolly Bove + Quigg LLP

(57) ABSTRACT

A process and a device for detecting aircrafts circulating in an air space surrounding an airplane is disclosed. The device (1A) comprises means (2, 3) for detecting an aircraft circulating in the air space surrounding the airplane and, in case of a detection, for determining a first position and a second position of the aircraft with respect to the airplane, and means (8A) for comparing said first and second positions so as to check whether they match.

11 Claims, 4 Drawing Sheets

U.S. PATENT DOCUMENTS

2009/0273504 A1* 11/2009 Meyers et al. .................. 342/42
2010/0039310 A1* 2/2010 Smith et al. .................... 342/29
2010/0292871 A1* 11/2010 Schultz et al. .................... 701/3
2010/0315281 A1* 12/2010 Askelson et al. ............... 342/30

* cited by examiner

PROCESS AND A DEVICE FOR DETECTING AIRCRAFTS CIRCULATING IN AN AIR SPACE SURROUNDING AN AIRPLANE

CROSS-REFERENCE TO RELATED APPLICATIONS

This application claims priority to French Patent Application 0903262, filed Jul. 3, 2009, the entire contents of which are incorporated herein by reference.

FIELD OF THE INVENTION

The present invention relates to a process and a device for detecting aircrafts circulating in an air space surrounding an airplane, as well as an aircraft provided with such a detection device.

BACKGROUND OF THE INVENTION

It is known that most airplanes, more specifically airliners, are provided with a collision avoidance system, in particular of the TCAS type (for <<Traffic alert and Collision Avoidance System>>) allowing to ensure the safety of the air traffic while preventing the collision risks in flight.

Such a TCAS collision avoidance system arranged on board an airplane operates independently from the ground air control. It allows to monitor the trajectories of aircrafts in the vicinity of the airplane being considered and to represent the respective positions thereof on a viewing screen. For detecting possible aircrafts in the air space surrounding the airplane, the TCAS collision avoidance system emits interrogation signals in all directions. When an aircraft circulating in such an air space receives such an interrogation signal, it emits in turn a response signal towards the airplane, so as to notify it of its presence.

From information contained in the response signal transmitted by the aircraft, the TCAS collision avoidance system of the airplane is able to determine the value of the parameters relating to this detected aircraft, such as the distance between it and the airplane, the altitude thereof, the angular positioning thereof with respect to said airplane (i.e. the angle defined between the longitudinal axis of the airplane and the straight line crossing the airplane and the aircraft), etc.

However, the accuracy of the angular positioning of the aircraft with respect to the airplane, being determined by the collision avoidance system, is low and frequently has an uncertainty margin of 15°. Such an inaccuracy makes the avoidance maneuver of the aircraft by the airplane risky in a horizontal plane, because of a high uncertainty about the exact position of the aircraft with respect to the airplane. Thus, all the avoidance steps are currently performed in a vertical plane (the airplane climbs or comes down for avoiding an aircraft).

In addition, the altitude positioning of the detected aircraft is obtained from altitude information contained in the reply signal sent by the aircraft. However, when such altitude information is wrong, the obtained altitude positioning proves to be erroneous. The airplane is then not properly positioned in the vertical plane by the collision avoidance system, which could compromise the avoidance maneuver of the latter.

SUMMARY OF THE INVENTION

The present invention aims to overcome such drawbacks. It relates to a process for detecting at least one aircraft circulating in an air space surrounding an airplane, said airplane comprising a collision avoidance system able to detect the presence of such an aircraft.

To this end, the process of this invention is remarkable in that it comprises the following steps consisting or comprising in A/ monitoring said air space, by means of said collision avoidance system, so as to detect the presence of an aircraft and, in case of a detection, determining at least one first position of said aircraft with respect to said airplane;

B/ monitoring said air space, by means of radar detection means provided on said airplane, so as to detect the presence of said aircraft and, in case of a detection, determining at least one second position of said aircraft with respect to said airplane;

determining a matching volume around at least one of said first and second positions; and C/ comparing when said collision avoidance system and said radar detection means each detect said aircraft in said air space, said first position to said second position, so as to check their match by means of said determined matching volume.

Thus, through this invention, a position redundancy for a detected aircraft is obtained with respect to the airplane. Such a redundancy is obtained by means (i.e. the collision avoidance system and the radar detection means) being independent and based on different detection principles. Such a redundancy thus allows to confirm the detection of an aircraft by the collision avoidance system (respectively the radar detection means) by means of the radar detection means (respectively of the collision avoidance system). Furthermore, using this invention, the risk of absence of detection of an aircraft is reduced in the air space of the airplane.

According to a particular embodiment of the present invention, in step C/:

it is checked whether the other position belongs to said matching volume; and in the case where the other position belongs to said matching volume, it is considered that said first and second positions match.

Thus, the position of the aircraft detected by the collision avoidance system or by the radar detection means can be confirmed.

Moreover, said matching volume is under the form of a sphere with a predefined radius:

the distance separating said first position from said second position is calculated;

said separation distance calculated at said predefined radius is compared; and in the case where said separation distance is at the most equal to said predefined radius, it is considered that said first and second positions of said aircraft match.

Furthermore, said radar detection means being able to perform, using a wave beam, an azimuth scanning following a predefined aperture angle, said predefined radius can be a function of at least one of the following parameters:

the resolution of said radar detection means;

the refreshing rate of the azimuth scanning of said radar detection means;

the velocity of said airplane.

Alternatively, said matching volume could have the form of a ring portion with a rectangular section.

According to another embodiment of this invention:

in step Co, such a matching volume is determined around each one of said first and second positions;

it is checked whether there is at least one part common to said thus determined matching volumes; and should such a common part exists, it is considered that said first and second positions match.

Advantageously, whatever the embodiment, when said first and second positions match, a consolidated position of said aircraft with respect to said airplane is determined from said positions. For example, such a consolidated position could correspond to the barycentre of the first position and of the second position.

Thus, it is possible to refine and to consolidate the position of the detected aircraft with respect to the airplane, as the uncertainty margin of the angular positioning, the height and the distance of the detected aircraft with respect to the airplane is significantly reduced.

Preferably, said radar detection means are able to perform, using a wave beam, an azimuth scanning following a predefined aperture angle. In step B/, by means of said wave beam, an azimuth scanning could be performed according to several predetermined elevation angles, an elevation angle being defined between the general direction of said wave beam and an horizontal plane.

According to a preferred embodiment according to the present invention:
said radar detection means are able to perform, using a wave beam, an azimuth scanning following a predefined aperture angle;
step A/ is implemented preliminarily to step B/;
after said aircraft has been detected by said collision avoidance system in step A/, a monitoring area of said air space is determined around said first position; and
in step B/, a monitoring is performed of said determined monitoring area by means of said radar detection means.

Thus, through radar detection means, the detection of an aircraft by the collision avoidance system can be confirmed. Furthermore, an analysis of the single monitoring area by the radar detection means allows to substantially reduce the detection period of the latter.

Advantageously, on display means embedded on board the airplane, a matching information can be displayed (for example in the form of a symbol), when said first and second positions of said aircraft match.

Furthermore, said first and second positions of said aircraft with respect to said airplane are preferably determined from the value of at least one of the following parameters:
the distance separating said detected aircraft from said airplane;
the angular positioning of said detected aircraft with respect to said airplane;
the height separating said airplane from said detected aircraft (i.e. the height separating the horizontal plane crossing the aircraft from the horizontal plane crossing the airplane).

This invention further relates to a device for detecting at least one aircraft circulating in an air space surrounding an airplane, said airplane comprising a collision avoidance system able to detect the presence of such an aircraft.

According to the invention, the device is remarkable in that it is arranged on board said airplane and in that it comprises:
said collision avoidance system able to monitor said air space, so as to detect the presence of an aircraft and to determine at least one first position of the latter with respect to said airplane;
radar detection means able to monitor said air space, so as to detect the presence of said aircraft and to determine at least one second position of the latter with respect to said airplane;
means for determining a matching volume around at least one of said first and second positions; and means for comparing said first position of said aircraft to said second position, so as to check whether they match, by means of said determined matching volume, when said collision avoidance system and said radar detection means each detect said aircraft in said air space.

This invention further relates to an aircraft comprising a device such as described herein above.

BRIEF DESCRIPTION OF THE DRAWINGS

The figures of the appended drawing will better explain how this invention can be implemented. In these figures like reference numerals relate to like components.

DETAILED DESCRIPTION

Figure 1:
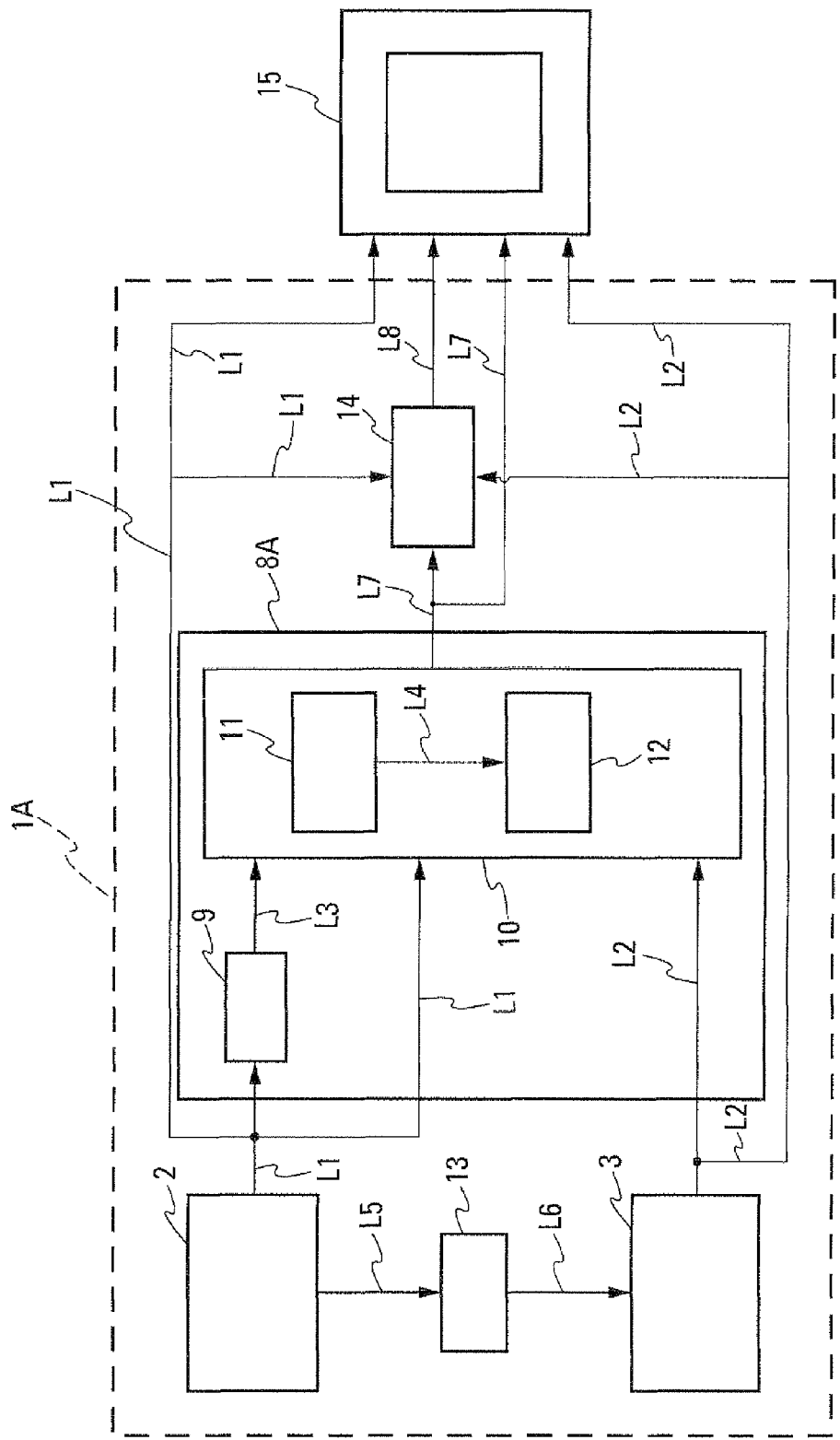
FIG. 1 shows, in a block diagram, a detection device according to the preferred embodiment of the present invention.
Figure 5:
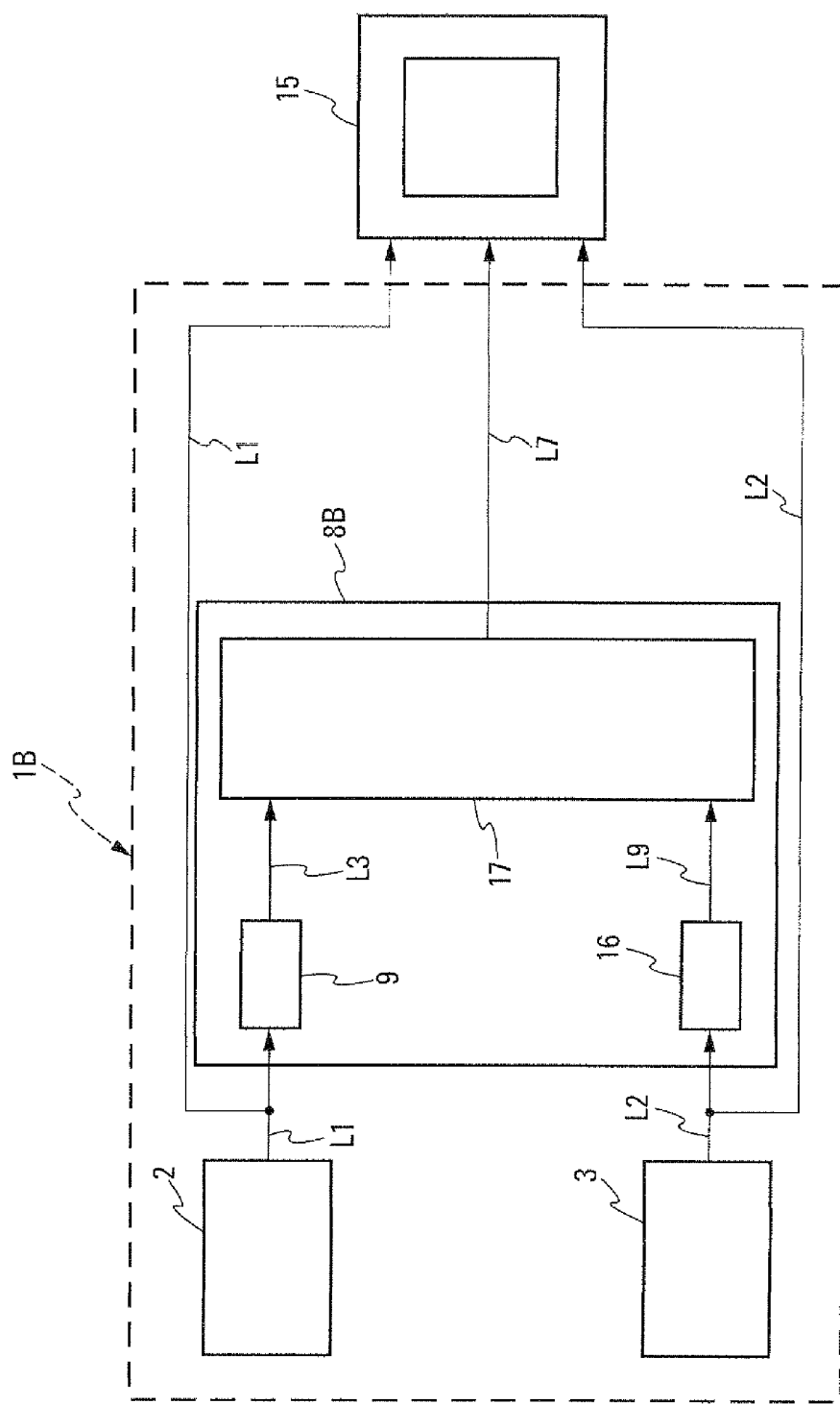
FIG. 5 shows the block diagram of a detection device according to another embodiment of the present invention.

FIGS. 1 and 5 show a detection device 1A, 1B on board an airplane AC, in particular a transport civil airplane.

Figure 2:
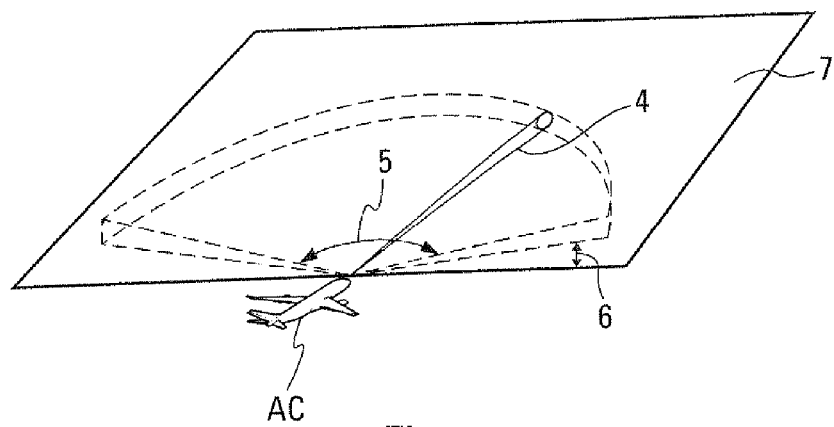
FIG. 2 schematically shows the scanning of a wave beam performed by radar detection means, according to the invention, embedded on board an airplane.

As shown on these figures, the detection device 1A, 1B comprises:
a collision avoidance system 2 of the TCAS type, as referred to hereinabove, adapted to monitor the air space surrounding the airplane AC, so as to detect the presence of an aircraft AI and to determine a first position P1 of such an aircraft AI with respect to the airplane AC;
radar detection means 3 able to monitor the air space surrounding the airplane AC, so as to detect the presence of such an aircraft AI and to determine a second position P2 of the latter with respect to the airplane AC. In order to perform such a detection (see FIG. 2), the radar detection means 3 usually emit a wave beam 4 and perform, using said beam, an azimuth scanning following a predefined aperture angle 5 and according to a predetermined elevation angle 6 (defined between the general direction of the wave beam 4 and an horizontal plane 7). Of course, any other type of existing radar detection means could be contemplated; and
means 8A, 8B for comparing the position P1 of the aircraft to the position P2 and thus checking whether they match, when the collision avoidance system 2 and the radar detection means 3 each detect the aircraft AI in the air space surrounding the airplane AC.

Thus, a redundancy is obtained of the position of the detected aircrafts with respect to the airplane AC. Such a redundancy is obtained by means 2 and 3 being independent one from the other and based on different detection principles. Indeed, the collision avoidance system 2 emits interrogation signals for which it expects a response signal from nearby aircrafts, whereas radar detection means 3 emit signals for afterwards analyzing the echo possibly sent back by the structure of the aircrafts.

Such a redundancy is used, more specifically, to confirm the detection of the aircraft AI by the collision avoidance system 2 (respectively the radar detection means 3) through radar detection means 3 (respectively the collision avoidance system 2).

Furthermore, using this invention, the risk of absence of detection of an aircraft is reduced in the air space of the airplane AC. Indeed, there is a low probability that an aircraft, not detected by the collision avoidance system 2 (for example because it does not reply to the interrogations thereof), is not detected by radar detection means 3, and inversely. The reliability of the detection is thus significantly improved.

For the sake of clarity, the detection of a single aircraft AI by the collision avoidance system 2 and by the radar detection means 3 has been considered. Obviously, it is clear that the invention also applies to the detection of several aircrafts.

According to this invention, the comparison means 8A, 8B of the detection device 1A, 1B comprise means 9 for determining a matching volume V1 around the position P1 of the aircraft AI determined by the collision avoidance system 2. Such means 9 are connected, via the link L1, to the collision avoidance system 2 and are able to receive the position P1 of the aircraft with respect to the airplane AC. The matching volume V1 corresponds to a set of positions with respect to the airplane AC, comprising more specifically the position P1.

Figure 3:
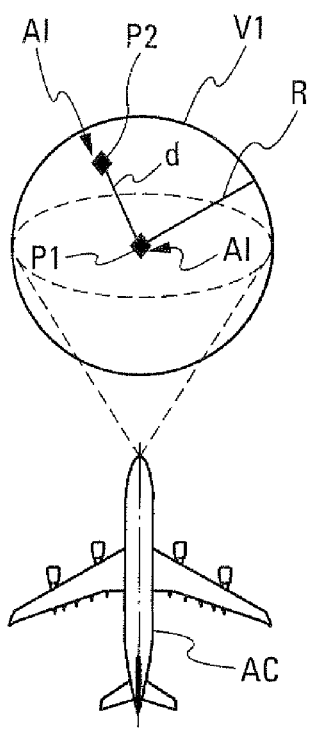
FIGS. 3 and 4 illustrate two examples, according to this invention, of a defined matching around a position of an aircraft detected by a collision avoidance system embedded on board the airplane.

As shown on FIG. 3, the matching volume could have the form of a sphere V1 centred on the position P1. The radius R of the sphere V1 could be a function of at least one of the following parameters:
the resolution of the radar detection means 3 (for example equal to 200 meters);
the refreshing rate of the azimuth scanning of the radar detection means 3;
the velocity of the airplane AC.

It is obvious that the radius R could also be a function of the uncertainty of measurements of the collision avoidance system 2.

Figure 4:
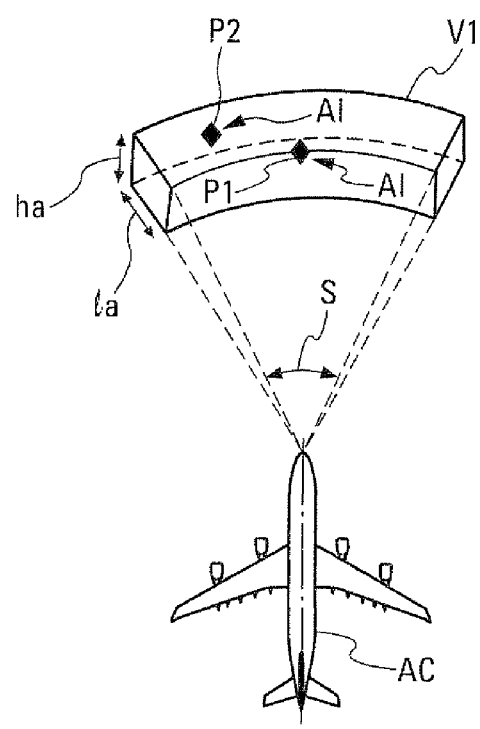

Alternatively, as shown on FIG. 4, the matching volume V1 could have the form of a ring portion with a rectangular section. The width la of the rectangular section could correspond to the uncertainty margin on the distance separating the aircraft AI from the airplane AC being inherent to the collision avoidance system 2. Similarly, the height ha of the rectangular section could correspond to the uncertainty margin on the height of the aircraft AI with respect to the airplane AC (i.e. the height separating the horizontal plane crossing the aircraft AI from the horizontal plane crossing the airplane AC) associated with the collision avoidance system 2. Furthermore, the angle S of the circular sector relating to the ring portion V1 can be equal to the uncertainty margin (for example equal to 15°) associated with the determination, through the collision avoidance system 2, of the angular positioning of the aircraft AI with respect to the airplane AC.

In a preferred embodiment of this invention shown on FIG. 1, the detection of the aircraft is preliminarily performed by the collision avoidance system 2 determining the position P1, then by the radar detection means 3 determining the position P2.

In such a preferred embodiment, the comparison means 8A comprise means 10 for checking that the position P2, as determined by the radar detection means 3, belongs to the matching volume V1. They are connected to the collision avoidance system 2, the radar detection means 3 and the determination means 9 of the matching volume, via respectively links L1, L2 and L3, so as to be able to receive the determined positions P1 and P2, as well as data on the matching volume V1.

When the position P2 belongs to the matching volume V1, the positions P1 and P2 are then considered as matching therebetween. In the opposite case, they do not match.

In a particular embodiment, when the matching volume V1 is a sphere, the match checking means 10 could comprise:
means 11 for calculating the distance d separating the position P1 from the position P2; and
means 12 for comparing the separation distance d to the radius of the matching sphere V1. Such means 12 are connected to calculation means 11 through the link L4. In the case where the separation distance d is at the most equal to the radius R of the sphere V1 (case shown on FIG. 3), the positions P1 and P2 are considered as matching. In the opposite case, they are not.

Moreover, in such an preferred embodiment, the detection device 1A comprising means 13 for determining a monitoring geographical area for said air space around the position P1 determined by the collision avoidance system 2. Such means 13 are connected to the latter, via the link L5, and are able to receive from the latter the position P1 of the aircraft AI.

Thus, when they receive the position P1 via the link L5, the means 13 determine a monitoring area around this position P1. They then transmit, via the link L6, information (distance, azimuth, elevation angle, etc. . . . ) regarding the thus determined monitoring area to the radar detection means 3. The latter are formed for only analyzing the determined monitoring, so as to detect the aircraft AI and to determine the position P2 of the latter with respect to the airplane AC. Thereby, the detection period of the radar detection means 3 is reduced.

For analyzing the monitoring area, the radar detection means 3 perform an azimuth scanning following an aperture angle adapted to the monitoring area. As a function of the dimensions of the latter, the radar detection means 3 can perform several azimuth scans at different elevation angles 6.

According to the preferred embodiment, the detection device 1A further comprises means 14 for determining a consolidated position of the aircraft AI with respect to the airplane AC from said positions P1 and P2, when the latter are considered as matching. To this end, the means 14 are connected to the collision avoidance system 2, the radar detection means 3 and the comparison means 8A, via the link L1, L2 and L7. They are able to deliver, in outlet, the determined consolidated position.

Such a consolidated position corresponds, for example, to the barycentre of the position P1 and the position P2. Alternatively, the consolidated position could also be equal to the position P1 determined by the collision avoidance system 2.

Display means 15, embedded on board the cockpit of the airplane AC, can display at least one piece of the following information:
the consolidated position determined by the means 14 (link L8);
the information supplied by the collision avoidance system 2 (link L1);
the information supplied by the radar detection means 3 (link L2);
matching information on the positions P1 and P2 coming from the comparison means 8A (link L7), presented for example under the form of one or more symbols.

Selecting the information displayed on the display means 15 is performed, for example, manually by the pilots, via selection means (not shown on the figures).

In another embodiment of this invention shown on FIG. 5, detecting the aircraft AI and determining the position P1 associated with the collision avoidance system 2 occur, either simultaneously or subsequently to detecting such an aircraft AI and to determining the position P2 by the radar detection means 3.

In such other embodiment, the comparison means 8B of the detection device 1B comprise means 16 for determining a matching volume V2 around the position P2 of the aircraft AI determined by the radar detection means 3. Such means 16 are connected, via the link L2, to the radar detection means 3 and are able to receive the position P2 of the aircraft AI with respect to the airplane AC.

Thereby, the means 9 determine a matching volume V1 around the position P1 and the means 16 determine a matching volume V2 around the position P2.

Figure 6:
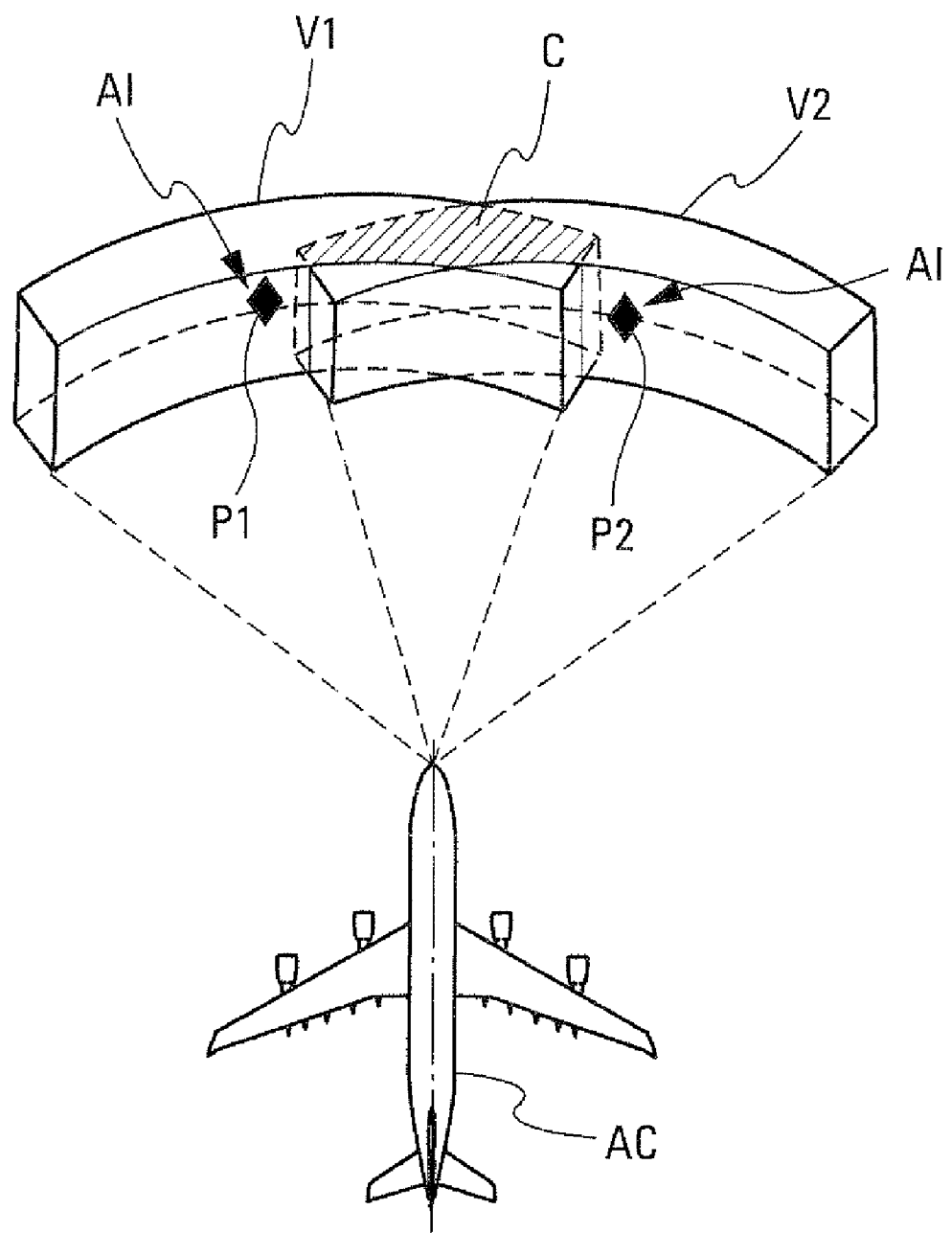
FIG. 6 shows the part being common to two defined matching volumes, according to this invention, respectively around a first position, determined by the collision avoidance system of the airplane, and a second position, determined by the radar detection means.

As shown in the example on FIG. 6, the two determined matching volumes V1 and V2 have the form of a ring portion with a rectangular section. They can have identical shape and dimensions or, inversely, different ones.

Moreover, the comparison means 8B comprise means 17 for checking whether there is at least one part C being common to the two determined matching volumes V1 and V2 (FIG. 6). Such checking means 17 are connected to the means 9 and 16, respectively via links L3 and L9. They are able to deliver, in outlet (link L7), information regarding the existence, or not, of such a common part C. Should the latter exists, said positions P1 and P2 of said aircraft AI are considered as matching.

It should be noticed that the comparison means 8A, 8B, the determining means 9 for a monitoring area and the determining means 14 for a consolidated position can be integrated into the collision avoidance system 2 of the airplane AC, or even still, into the radar detection means 3 of the latter.

Furthermore, when the aircraft is detected by the radar detection means 3, without being detected by the collision avoidance system 2, the present invention can emphasize:
a dysfunction of the collision avoidance system of the airplane AC;
a dysfunction of the set formed by the collision avoidance system 2 of the airplane AC and the transponder of the aircraft not detected by the collision avoidance system 2;
the fact that the aircraft is not provided with an operational transponder.

Furthermore, whatever the above mentioned embodiment being considered, it could be contemplated that the pilots determine themselves the azimuth angle around which they want the radar detection means 3 to perform monitoring.

The invention claimed is:

1. A process for detecting at least one aircraft (AI) circulating in the air space surrounding an airplane (AC), said airplane (AC) comprising a collision avoidance system (2) able to detect the presence of such an aircraft (AI), said process comprising the following steps:
A/ monitoring said air space, by means of said collision avoidance system (2), so as to detect the presence of an aircraft (AI) and, in case of a detection, determining at least one first position (P) of said aircraft with respect to said airplane (AC);
B/ monitoring said air space through the radar detection means (3) arranged on board said airplane (AC), so as to detect the presence of said aircraft (AI) and, in case of a detection, determining at least one second position (P2) of said aircraft with respect to said airplane (AC);
Co/ determining a matching volume (V1, V2) centered around at least one of said first and second positions (P1, P2); and
C/ when said collision avoidance system (2) and said radar detection means (3) each detect said aircraft (AI) in said air space, comparing said first position (P1) to said second position (P2), so as to check whether they match, using said determined matching volume (V1, V2).

2. The process according to claim 1, wherein, step C/ comprises:
checking whether the other position (P1, P2) belongs to said matching volume (V1, V2); and
in the case where the other position (P1, P2) belongs to said matching volume (V1, V2), it is considered that said first and second positions (P1, P2) match.

3. The process according to claim 2, wherein:
said matching volume (V1, V2) has the form of a sphere with a predefined radius (R);
the distance (d) separating said first position (P1) from said second position (P2) is calculated;
said calculated separation distance (d) is compared to said predefined radius (R); and
in the case where said separation distance (d) is at the most equal to said predefined radius (R), it is considered that said first and second positions (P1, P2) of said aircraft (AI) match.

4. The process according to claim 2, wherein said matching volume (V1, V2) has the form of a ring portion with a rectangular section.

5. The process according to claim 1, wherein step Co/ comprises:
determining a matching volume (V1, V2) centered around each one of said first and second positions (P1, P2);
checking whether there is at least one part common (C) to said thus determined matching volumes (V1, V2); and
should such a common part (C) exists, it is considered that said first and second positions (P1, P2) match.

6. The process according to claim 1, wherein, when said first and second positions (P1, P2) match, a consolidated position of said aircraft (AI) is determined with respect to said airplane (AC) from said positions (P1, P2).

7. The process according to claim 1, wherein:
the detection radar means (3) are able to perform, through a wave beam (4), an azimuth scanning following a predefined aperture angle (5); and
in step B/, by means of said wave beam (4), an azimuth scanning is performed according to several predetermined elevation angles (6), an elevation angle (6) being defined between the general direction of said wave beam (4) and an horizontal plane (7).

8. The process according to claim 1, wherein:
said detection radar means (3) are able to perform, through a wave beam (4), an azimuth scanning following a predefined aperture angle (5);
the step A/ is implemented preliminarily to step B/;
after said aircraft (AI) has been detected by said collision avoidance system (2) in step A/, a monitoring area of said air space is determined around said first position (P1); and
in step B/, a monitoring is performed of said determined monitoring area by means of said radar detection means (3).

9. A device for detecting at least one aircraft (AI) circulating in the air space surrounding an airplane (AC), said airplane (AC) comprising a collision avoidance system (2) able to detect the presence of such an aircraft (AI),
said device being arranged on board said airplane (AC) and comprising:
said collision avoidance system (2) able to monitor said air space, so as to detect the presence of an aircraft (AI) and to determine at least one first position (P1) of the latter with respect to said airplane (AC);

radar detection means (3) able to monitor said air space, so as to detect the presence of said aircraft (AI) and to determine at least one second position (P2) of the latter with respect to said airplane (AC);

means (9) for determining a matching volume (V1, V2) centered around at least one of said first and second positions (P1, P2); and means (8) for comparing said first position (P1) of said aircraft (AI) to said second position (P2), so as to check whether they match through said determined matching volume (V1, V2), when said collision avoidance system (2) and said radar detection means (3) each detect said aircraft (AI) in said air space.

10. An aircraft, comprising a device (1A, 1B) as specified in claim 9.

11. A process for detecting at least one aircraft (AI) circulating in the air space surrounding an airplane (AC), said airplane (AC) comprising a collision avoidance system (2) able to detect the presence of such an aircraft (AI), said process comprising the following steps:

A/ monitoring said air space, by means of said collision avoidance system (2), so as to detect the presence of an aircraft (AI) and, in case of a detection, determining at least one first position (P) of said aircraft with respect to said airplane (AC);

B/ monitoring said air space through the radar detection means (3) arranged on board said airplane (AC), so as to detect the presence of said aircraft (AI) and, in case of a detection, determining at least one second position (P2) of said aircraft with respect to said airplane (AC);

Co/ determining a matching volume (V1, V2) centered around each one of said first and second positions (P1, P2);

checking whether there is at least one part common (C) to said thus determined matching volumes (V1, V2); and should such a common part (C) exists, it is considered that said first and second positions (P1, P2) match;

C/ when said collision avoidance system (2) and said radar detection means (3) each detect said aircraft (AI) in said air space, comparing said first position (P1) to said second position (P2), so as to check whether they match, using said determined matching volume (V1, V2).

\* \* \* \* \*